United States Patent Office 2,852,363
Patented Sept. 16, 1958

2,852,363
PREPARATION OF ALKALI METALS

Roy M. Adams, Darlington, and Stuart G. McGriff, Gibsonia, Pa., assignors to Callery Chemical Company, Pittsburgh, Pa., a corporation of Pennsylvania No Drawing. Application October 20, 1955
Serial No. 541,859

6 Claims. (Cl. 75—66)

This invention relates to a new and improved method for the preparation of certain alkali metals and in particular it relates to a new and improved method for preparing potassium, rubidium and cesium by the reaction of an alkali metal oxide with zinc.

In general, the alkali metals can be made by the electrolysis of molten salts such as the alkali metal halides or hydroxides or by thermochemical reduction of a salt such as an alkali metal carbonate or halide. Sodium is produced commercially by the electrolysis of a molten mixture of sodium chloride and calcium chloride in the familiar Downs cell. Sodium can also be produced by the thermochemical reduction of sodium carbonate or sodium hydroxide using carbon or iron-carbon mixtures as reducing agents. Potassium is produced thermochemically by the distillation of potassium chloride with metallic sodium as described in United States Patent 2,480,655. A similar process using potassium hydroxide and sodium is claimed in United States Patent 1,872,611. Thermochemical methods similar to those for producing sodium have never been satisfactory for potassium since it reacts with the carbon monoxide formed to produce an explosive carbonyl. Electrolytic methods for producing potassium have never been completely successful due to the high vapor pressure of potassium at practical cell operating temperature, a high corrosion rate and the fact that potassium reacts with oxygen more rapidly than does sodium. Cesium and rubidium are both made by the thermochemical reduction of their chlorides with calcium. In view of the diverse methods used to prepare the individual alkali metals it appeared desirable to develop a method which could be used with equal effectiveness to produce potassium, cesium and rubidium.

It is an object of this invention to provide a new and improved method for preparing elemental potassium, cesium and rubidium.

Another object is to provide a new and improved method for preparing potassium, cesium and rubidium by the reaction of an alkali metal oxide with zinc.

Other objects will become apparent as the invention is more fully described throughout the following specification and appended claims.

This invention is based upon the discovery that an alkali metal oxide can be reacted with zinc to yield the pure alkali metal and zinc oxide. Experiments and thermodynamic calculations which were made indicated that ZnO is more stable than the alkali metal oxides at elevated temperatures. From these experiments and calculations we decided that $K_2O + Zn \rightarrow 2K + ZnO$ should occur at 250°–300° C. Since the reaction

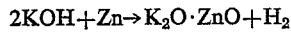

is known to proceed rapidly in fused potassium hydroxide, it appeared likely that the following reactions would occur at a reasonably low temeprature:

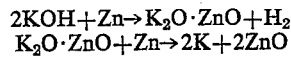

The fact that the above reactions do proceed as written has been confirmed by experimentation. However, these reactions require a much higher temperature than was indicated by our previous experiments and calculations. Comparable reactions occur when the oxides of rubidium and cesium are used.

In carrying out the reaction disclosed, separation of the alkali metal is accomplished by boiling the metal out of the reaction mixture. Thus, a reaction temperature above the boiling point of the alkali metal is preferred. To prepare potassium the reaction temperature should be about 800° C. at atmospheric pressure to permit separation of the potassium from the zinc by distillation and to improve the reaction kinetics. Since cesium and rubidium boil at 670° C. and 700° C. at atmospheric pressure, respectively, the reaction temperature for the preparation of these metals can be somewhat lower than that required to prepare potassium. The reaction will take place at lower temperatures if vacuum is used to remove the metal from the reaction zone.

In one experiment, elemental potassium was prepared as follows: in a Pyrex glass tube with an inlet and outlet for nitrogen was placed 0.78 mol of KOH and 1.02 gram atoms of zinc. The exit end of the tube was connected to a trap filled with an inert solvent such as toluene and then to a mercury bubbler. The center portion of the tube was heated at 760° C. at atmospheric pressure for one hour in an electric furnace using a continuous nitrogen sweep. A grey metallic deposit formed at the exit end of the reaction tube which was air cooled. This deposit was identified as potassium.

In another experiment using the same procedure and ratio of reactants, the mixture of zinc and potassium hydroxide was heated for two hours at 850° C. At this temperature, a considerable quantity of elemental potassium distilled from the reaction mixture and was collected in the trap containing toluene from which it was separated by filtration in an inert atmosphere.

The above mentioned experiments were carried out above the boiling point of potassium at atmospheric pressure. It should be noted that lower temperatures may be used if vacuum or a sweep gas is used to reduce the partial pressure in the reaction zone. It should also be noted that while the reaction is described as taking place between zinc and potassium hydroxide, most of the hydrogen is removed in the early stages of the reaction so that the reaction actually takes place between zinc and potassium monoxide. If desired potassium monoxide may be used as a starting material instead of potassium hydroxide.

Similarly, the oxides and hydroxides of cesium and rubidium when heated in the presence of zinc at a temperature in excess of the boiling point of the free metals respectively will produce elemental cesium and rubidium.

The major advantages of this process are that it avoids the difficult electrolyses of the prior art processes as well as the dangerous carbothermic reduction of potassium, cesium and rubidium carbonates or hydroxides.

After reading the specific embodiments of this invention as described herein, it will be obvious to those skilled in the art that other modifications are possible. It should therefore be understood that within the scope of the appended claims, this invention may be practiced otherwise than as specifically described.

What we desire to particularly point out and distinctly claim as our invention is:

1. A method of preparing metal of the group consisting of potassium, cesium and rubidium which comprises heating a compound of the group consisting of the oxides and hydroxides of potassium, cesium and rubidium with not less than a stoichiometric amount of zinc according to the equations: $2MOH + 2Zn \rightarrow 2M + 2ZnO + H_2$;

$$M_2O + Zn \rightarrow 2M + ZnO$$

where M is the desired alkali metal at a temperature above the boiling point of the free alkali metal at the pressure used in the reactor and recovering the free alkali metal evolved from the reaction mixture.

2. A method according to claim 1 in which an inert gas sweep is continuously maintained over the reactants during the reaction.

3. A method according to claim 1 in which a slight stoichiometric excess of zinc is used.

4. A method of preparing potassium which comprises heating a mixture of potassium hydroxide and zinc in an inert atmosphere at about 800° C. and atmospheric pressure and recovering the free potassium metal evolved by condensation.

5. A method of preparing cesium which comprises heating a mixture of cesium hydroxide and zinc in an inert atmosphere at a temperature above the boiling point of cesium metal at the pressure used in the reactor and recovering the cesium metal evolved from the reaction mixture.

6. A method of preparing rubidium which comprises heating a mixture of rubidium hydroxide and zinc in an inert atmosphere at a temperature above the boiling point of rubidium metal at the pressure used in the reactor and recovering the rubidium metal evolved from the reaction mixture.

References Cited in the file of this patent

UNITED STATES PATENTS

| | | |
|---|---|---|
| 1,016,758 | Mehner | Feb. 6, 1912 |
| 2,028,390 | Hanson | Jan. 21, 1936 |